US010348821B2

(12) United States Patent
Hunter et al.

(10) Patent No.: US 10,348,821 B2
(45) Date of Patent: Jul. 9, 2019

(54) PRIORITIZING STRUCTURAL OPERATIONS AND DISTRIBUTING CHANGES IN A SYNCED ONLINE CONTENT MANAGEMENT SYSTEM

(71) Applicant: Dropbox, Inc., San Francisco, CA (US)

(72) Inventors: Rian Hunter, San Francisco, CA (US); David Euresti, San Francisco, CA (US); Brian Smith, San Francisco, CA (US); Alicia Chen, San Francisco, CA (US); Alex Sydell, San Francisco, CA (US); Aston Motes, San Francisco, CA (US); Jie Tang, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 1906 days.

(21) Appl. No.: 13/724,747

(22) Filed: Dec. 21, 2012

(65) Prior Publication Data

US 2014/0181213 A1 Jun. 26, 2014

(51) Int. Cl.
*H04L 29/08* (2006.01)
*G06F 16/93* (2019.01)

(52) U.S. Cl.
CPC .......... *H04L 67/1095* (2013.01); *G06F 16/93* (2019.01); *H04L 67/322* (2013.01)

(58) Field of Classification Search
CPC ......... G06F 17/30067; G06F 17/30174; G06F 17/24; G06F 17/3089; H04L 67/1074; H04L 67/1095; H04L 67/322

USPC .......................................................... 709/205
See application file for complete search history.

(56) References Cited

U.S. PATENT DOCUMENTS

| 4,942,569 | A | * | 7/1990 | Maeno | H04L 47/10 370/230 |
| 6,324,544 | B1 | * | 11/2001 | Alam | G06F 17/30067 |
| 6,735,760 | B1 | * | 5/2004 | Dice | G06F 9/52 717/139 |
| 6,772,209 | B1 | * | 8/2004 | Chernock | H04L 29/06027 709/225 |
| 8,213,332 | B2 | * | 7/2012 | Prasad | G06F 16/178 370/252 |
| 8,239,229 | B1 | * | 8/2012 | Paiz | G06Q 10/083 705/7.11 |

(Continued)

*Primary Examiner* — Joshua Joo
(74) *Attorney, Agent, or Firm* — Polsinelli PC

(57) ABSTRACT

Disclosed are systems, methods, and non-transitory computer-readable storage media for prioritizing structural operations and distributing changes in a synced online content management system. An exemplary method can include receiving, from a first client device, a first structural operation for a particular content item and an account within the online content management system. The method can also include receiving, from a second client device, a competing structural operation for the particular content item and the account. The method can then include prioritizing the first structural operation from the first client device over the competing structural operation from the second client device based on predetermined factors. The method can then include executing the first structural operation for the particular content item and the account. The exemplary method can then include distributing the prioritized first structural operation to all synced devices for execution.

21 Claims, 13 Drawing Sheets

(56) References Cited

U.S. PATENT DOCUMENTS

| | | | | | |
|---|---|---|---|---|---|
| 8,527,549 | B2* | 9/2013 | Cidon | G06F 17/30174 707/802 |
| 8,762,327 | B2* | 6/2014 | Van Riel | G06F 17/24 707/610 |
| 8,812,651 | B1* | 8/2014 | Eriksen | H04L 45/745 709/224 |
| 9,124,767 | B2* | 9/2015 | Barrett | H04N 7/163 |
| 2002/0064281 | A1 | 5/2002 | Ishizaka | G06F 21/6209 380/201 |
| 2002/0112035 | A1* | 8/2002 | Carey | G06F 17/30867 709/219 |
| 2002/0188667 | A1* | 12/2002 | Kirnos | G06F 17/30176 709/203 |
| 2003/0097581 | A1* | 5/2003 | Zimmer | G06F 21/57 726/10 |
| 2003/0151629 | A1* | 8/2003 | Krebs | G09B 7/00 715/810 |
| 2003/0227487 | A1* | 12/2003 | Hugh | G06F 17/30958 715/777 |
| 2004/0059721 | A1* | 3/2004 | Patzer | G06F 19/28 |
| 2004/0210608 | A1* | 10/2004 | Lee | G06F 11/1451 |
| 2005/0141661 | A1* | 6/2005 | Renaud | G06F 13/385 375/372 |
| 2005/0144200 | A1* | 6/2005 | Hesselink | H04L 63/0209 |
| 2005/0172296 | A1* | 8/2005 | Schleifer | G06F 17/30581 719/310 |
| 2005/0210459 | A1* | 9/2005 | Henderson | G06F 8/65 717/168 |
| 2005/0278408 | A1* | 12/2005 | Matsumoto | H04L 67/1008 709/200 |
| 2005/0289189 | A1* | 12/2005 | Nettleton | G06F 17/30578 |
| 2006/0015393 | A1* | 1/2006 | Eisma | G06Q 10/06 705/7.14 |
| 2006/0041838 | A1* | 2/2006 | Khan | G06F 17/2247 715/234 |
| 2006/0064585 | A1* | 3/2006 | Feinleib | G06F 21/121 713/165 |
| 2006/0080397 | A1* | 4/2006 | Chene | H04L 67/00 709/213 |
| 2006/0106881 | A1* | 5/2006 | Leung | G06F 17/30578 |
| 2006/0120252 | A1* | 6/2006 | Kanda | G11B 7/005 369/125 |
| 2006/0277223 | A1* | 12/2006 | Gupta | G06F 17/30194 |
| 2007/0002369 | A1* | 1/2007 | Inoue | G06F 3/1206 358/1.15 |
| 2007/0016771 | A1* | 1/2007 | Allison | G06F 21/6209 713/165 |
| 2007/0162517 | A1* | 7/2007 | Teegan | G06F 17/30569 |
| 2007/0206083 | A1* | 9/2007 | Hoshino | B41J 11/002 347/102 |
| 2007/0250468 | A1* | 10/2007 | Pieper | G06F 17/3089 |
| 2008/0104202 | A1* | 5/2008 | Barrett | H04N 7/163 709/219 |
| 2009/0006996 | A1* | 1/2009 | Saha | G06F 21/6218 715/765 |
| 2009/0037382 | A1* | 2/2009 | Ansari | G06F 17/30749 |
| 2009/0106816 | A1* | 4/2009 | Ito | G06F 21/6218 726/1 |
| 2009/0171648 | A1* | 7/2009 | Watanabe | G06F 11/3664 703/21 |
| 2009/0178102 | A1* | 7/2009 | Alghathbar | G06F 21/6218 726/1 |
| 2010/0043051 | A1* | 2/2010 | Deputat | H04L 63/20 726/1 |
| 2010/0114988 | A1* | 5/2010 | Linn | G06Q 10/10 707/805 |
| 2010/0257148 | A1* | 10/2010 | Kroeger | G06F 11/1004 707/697 |
| 2010/0257229 | A1* | 10/2010 | Bolohan | G06F 9/4843 709/203 |
| 2011/0151837 | A1* | 6/2011 | Winbush, III | H04W 8/22 455/412.1 |
| 2011/0161168 | A1* | 6/2011 | Dubnicki | G06F 17/30707 705/14.49 |
| 2011/0161289 | A1* | 6/2011 | Pei | G06F 17/30581 707/613 |
| 2011/0202848 | A1* | 8/2011 | Ismalon | G06F 17/3089 715/738 |
| 2011/0216650 | A1* | 9/2011 | Jin | H04L 12/26 370/230 |
| 2011/0218964 | A1* | 9/2011 | Hagan | G06F 17/30581 707/626 |
| 2011/0264768 | A1* | 10/2011 | Walker | H04N 21/00 709/218 |
| 2011/0289052 | A1* | 11/2011 | Rambacher | G06F 17/30575 707/624 |
| 2011/0313972 | A1* | 12/2011 | Albouze | G06F 17/30174 707/624 |
| 2012/0047201 | A1* | 2/2012 | Jain | H04N 21/26225 709/203 |
| 2012/0096116 | A1* | 4/2012 | Mislove | H04L 67/2814 709/217 |
| 2012/0109952 | A1* | 5/2012 | Reddy | H04L 67/1095 707/736 |
| 2012/0149000 | A1* | 6/2012 | Baker | G09B 7/00 434/362 |
| 2012/0254180 | A1* | 10/2012 | Biderman | H04L 67/1095 707/737 |
| 2013/0073808 | A1* | 3/2013 | Puthalath | H04L 67/1095 711/119 |
| 2013/0179398 | A1* | 7/2013 | Liao | G06F 17/30174 707/610 |
| 2013/0198841 | A1* | 8/2013 | Poulson | G06F 21/566 726/23 |
| 2013/0227038 | A1* | 8/2013 | Rich | H04L 29/06476 709/206 |
| 2013/0311598 | A1* | 11/2013 | Arrouye | G06Q 10/10 709/217 |
| 2014/0136600 | A1* | 5/2014 | Kao | G06F 16/1824 709/203 |
| 2014/0334794 | A1* | 11/2014 | Walker | G06T 11/206 386/219 |
| 2015/0199411 | A1* | 7/2015 | Greenspan | G06F 17/30548 715/229 |
| 2016/0248772 | A1* | 8/2016 | L'Heureux | H04W 12/06 |

\* cited by examiner

|   | hash | ID | deleted? |
|---|------|-----|----------|
| 1. | B (502) | DSC001.jpg (504) | yes (506) |

FIG. 5

|   | hash | ID | deleted? |
|---|---|---|---|
| 1. | B (602) | DSC001.jpg (604) | yes (606) |
| 2. | B (608) | Happy.jpg (610) | no (612) |

FIG. 6

| | hash | ID | deleted |
|---|---|---|---|
| 1. | B (702) | DSC001.jpg (704) | yes (706) |
| 2. | C (708) | DSC001.jpg (710) | no (712) |

FIG. 7

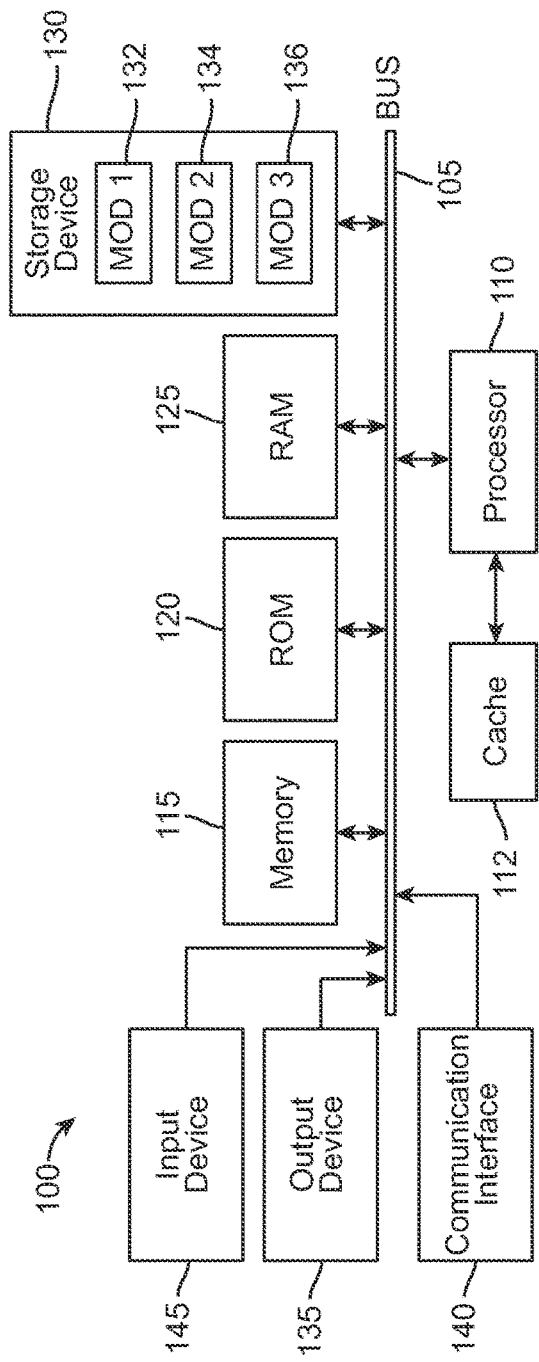
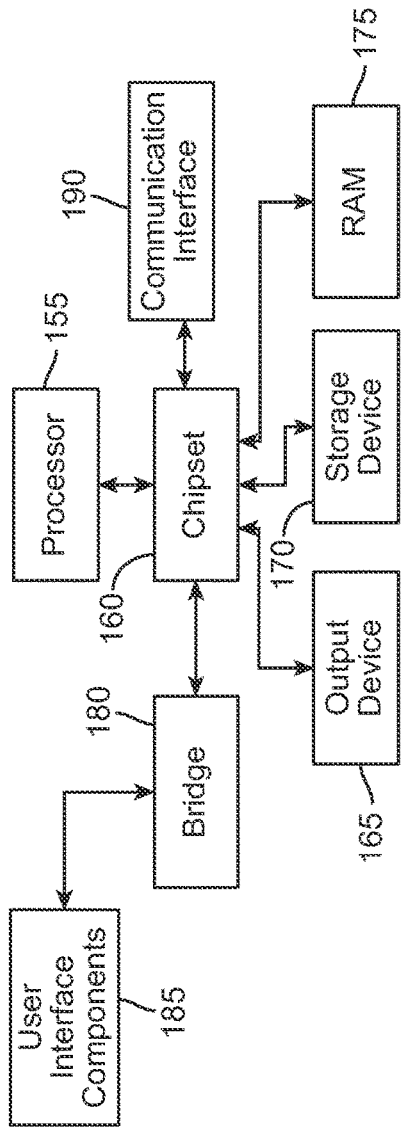

PRIORITIZING STRUCTURAL OPERATIONS AND DISTRIBUTING CHANGES IN A SYNCED ONLINE CONTENT MANAGEMENT SYSTEM

TECHNICAL FIELD

The disclosed technology pertains to synced online content management systems and more specifically to prioritizing structural operations and distributing changes in such systems.

BACKGROUND

Many electronic file management, storage, and related services are remote, or "cloud" based. That is, many services allow a user to upload, store, and share files through remote servers. These services frequently centralize files (e.g., photos) and allow a user to access these centrally stored files through multiple devices and/or locations, utilizing a single account. This is especially useful for at least three reasons. First, handheld devices, such as smart phones, tablets, and cameras, may have limited storage space. Second, as resolution and quality increases, files, such as photos and videos, are becoming very large. Third, the centrally stored files are more secure and less susceptible to data loss. Cloud-based storage helps to eliminate or reduce these problems by allowing a user to store large files remotely and then access them through multiple devices.

To make this process more efficient for the user, some services include an automatic upload or synchronization feature. These services allow a user to setup their device to allow automatic uploads of files to a central server system. When the user has multiple devices that are configured to allow for automatic uploads, a system runs the risk of receiving competing structural operations for a particular file from multiple devices. In a particular example, a user may take a photo on their smart phone, copy the photo to a laptop, and edit the photo on the laptop. The user may then sync the smart phone and laptop with the central server system causing competing structural operations. In another example, a desktop client can send a structural operation to delete a photo stored on a central server, while a mobile client sends a structural operation to add, rename, or edit the photo, thus causing competing structural operations. Thus, a need exists for improved systems, methods, and computer readable media for prioritizing structural operations and distributing changes in a synced online content management system.

SUMMARY

Disclosed are systems, methods, and non-transitory computer-readable storage media for prioritizing structural operations and distributing changes in a synced online content management system. An exemplary method can include receiving, from a first client device such as a desktop or laptop computer, a first structural operation for a particular content item and account within a synced online content management system. The method can also include receiving, from a second client device such as a mobile phone or tablet computer, a competing structural operation for the particular content item and the account. The exemplary method can then include prioritizing the first structural operation from the first client device over the competing structural operation from the second client device based on predetermined factors. First example predetermined factors include device type of the first client device and device type of the second client device. Second example predetermined factors include detected higher level of authority for the first client device and a lower level of authority for the second client device. Third example predetermined factors include detected master access to the account for the first client and shared access to the account for the second client device The exemplary method can then include, in response to prioritizing the first structural operation from the first client device over the competing structural operation from the second client device, executing the first structural operation for the particular content item and account. The exemplary method can then include distributing the prioritized first structural operation to all synced devices for execution.

In a first additional example, the first structural operation includes deleting the particular content item from the account and the competing structural operation includes adding the particular content item to the account. In a second example, the first structural operation includes deleting the particular content item and the competing structural operation includes adding a renamed copy of the particular content item to the account. In a third example, the first structural operation includes deleting the particular content item and the competing structural operation includes adding an edited version of the particular tile to the account. Additional combinations of first structural operation and competing structural operation are also possible.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 shows an entry table corresponding to the executed first structural operation from FIG. 2B;

FIG. 6 shows an entry table corresponding to the executed first structural operation from FIG. 3B;

FIG. 7 shows an entry table corresponding to the executed first structural operation from FIG. 4B;

FIG. 10A shows a first example system; and

FIG. 10B shows a second example system.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for improved systems, methods, and computer readable media for prioritizing structural operations and distributing changes in a synced online content management system.

An exemplary method can include receiving, from a first client device, such as a desktop or laptop computer, a first structural operation for a particular content item and an account within a synced online content management system. The method can also include receiving, from a second client device, such as a mobile phone or tablet computer, a competing structural operation for the particular content item and the account. The exemplary method can then include prioritizing the first structural operation from the first client device over the competing structural operation from the second client device based on predetermined factors. The predetermined factors can include a detected device type of the first client device and a detected device type of the second client device. The predetermined factors can also include a detected higher level of authority for the first client device and a lower level of authority for the second client device. The predetermined factors can also include detection that the first client device has master access to the account and the second client device has shared access to the account.

The exemplary method can then include, in response to the prioritizing the first structural operation from the first client device over the competing structural operation from the second client device, executing the first structural operation for the particular content item and the account. The exemplary method can then include distributing the prioritized first structural operation to all synced devices for execution. Any structural operations including competing structural operations, conflicting structural operations, etc., received from multiple devices can utilize the disclosed technology.

Figure 1:
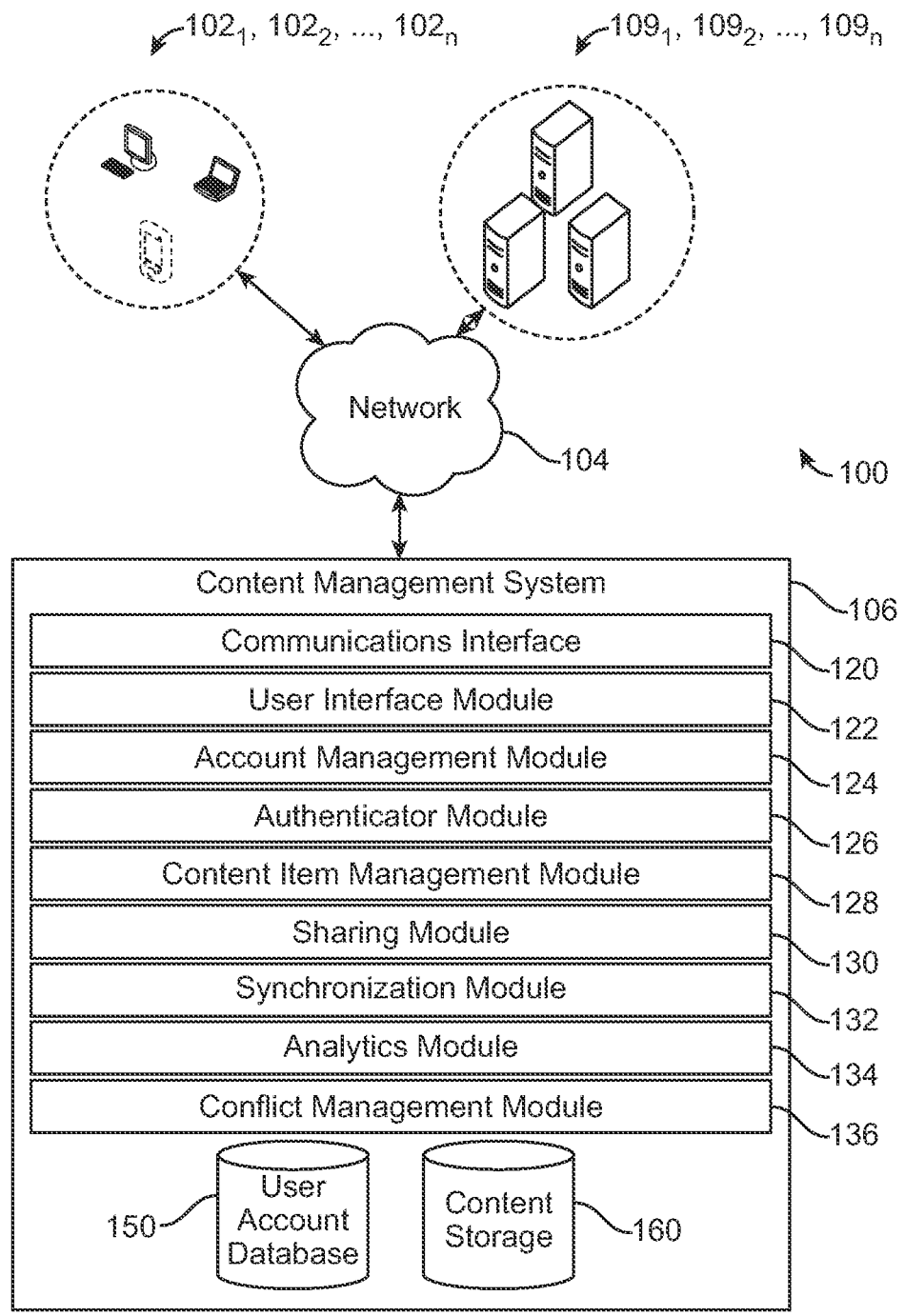
FIG. 1 shows an exemplary configuration of devices and a network in accordance with the disclosed technology.

An exemplary system configuration 100 is shown in FIG. 1, wherein electronic devices communicate via a network for purposes of exchanging content and other data. The system can be configured for use on a wide area network such as that shown in FIG. 1. However, the disclosed principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device 102.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can update and/or obtain user account details in user account database 150. The account management module 124 can interact with any number of other modules in content management system 106.

An account can store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106.

Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for content item changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can add a user account identifier to the content entry associated with the content item, thus granting the added user account access to the content item. Sharing module 130 can also remove user account identifiers from a content entry to restrict a user account's access to the content item.

To share content publicly, sharing module 130 can generate a custom network address, such as a uniform resource locator (URL), which allows any web browser to access the content in content management system 106 without any authentication. To accomplish this, sharing module 130 can include content identification data in the generated URL, which can later be used to properly identify and return the requested content item. For example, sharing module 130 can include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can change the value of the flag to 1 or true after generating a URL to the content item.

In some embodiments, sharing module 130 can also deactivate a generated URL. For example, each content entry can also include a URL active flag indicating whether the content should be returned in response to a request from the generated URL. For example, sharing module 130 can only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Conflict management module 136 can prioritize a first structural operation received from a first client device over a competing or conflicting structural operation received from a second device. In one example, the first structural operation can include deleting a particular content item from an account and the competing structural operation can include adding the particular content item to the account. In a second example, the first structural operation can include deleting the particular content item and the competing structural operation can include adding a renamed copy of the particular content item to the account. In a third example, the first structural operation can include deleting the particular content item and the competing structural operation can include adding an edited version of the particular content item to the account. These examples are not limiting and the system can prioritize any structural operation over another. Structural operations can include any action capable of being executed by a mobile device, mobile phone, tablet computer, laptop computer, desktop computer, etc.

In a further example, conflict management module 136 can send a command to one or more client devices 102 to delete a local copy of the particular content item. In a further example, conflict management module 136 can deny any future requests from client devices 102 to add the particular content item to the account once it has been deleted.

While content management system 106 is presented with specific components, it should be understood by one skilled in the art, that the architectural configuration of system 106 is simply one possible configuration and that other configurations with more or less components are also possible.

Figure 2A:
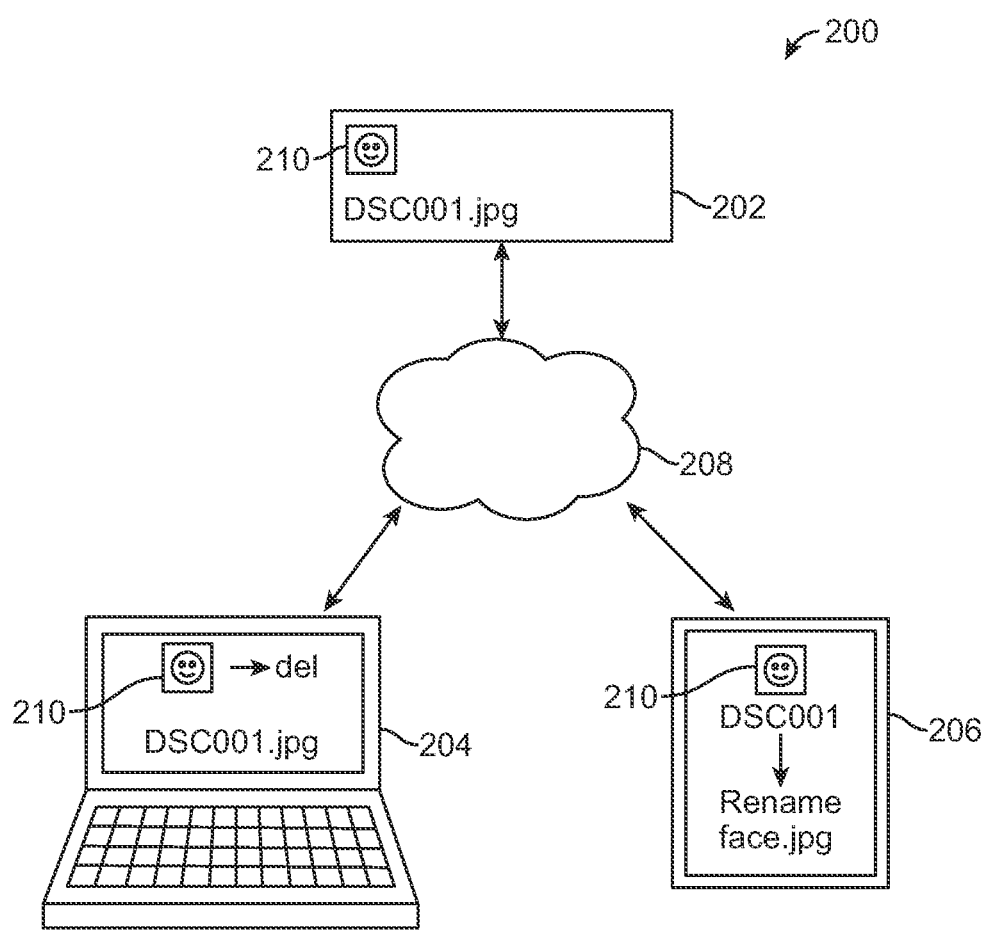
FIG. 2A shows a synced online content management system in which a first structural operation is sent from a first client device and a competing structural operation is sent from a second client device.

FIG. 2A shows a synced online content management system in which a first structural operation is sent from a first client device and a competing structural operation is sent from a second client device. Example sync environment 200 includes content management server 202 that communicates with synced devices laptop 204 and mobile device 206 over network 208. As shown in FIG. 2A, image 210 is synced between content management server 202, laptop 204, and mobile device 206. Content management server 202 receives a first structural operation or command from laptop 204 to delete image 210. Content management server 202 receives a competing structural operation or command from mobile device 206 to rename image 210 from "DSC001.jpg" to "face.jpg". The first structural operation and competing structural operation shown in FIG. 2A are illustrative only and any structural operations capable of being sent by synced devices in a synced online content management system can utilize the disclosed technology.

Although the term "structural operation" is used herein, any command or other communication method between synced devices in a synced online management system can utilize the disclosed technology.

Figure 2B:
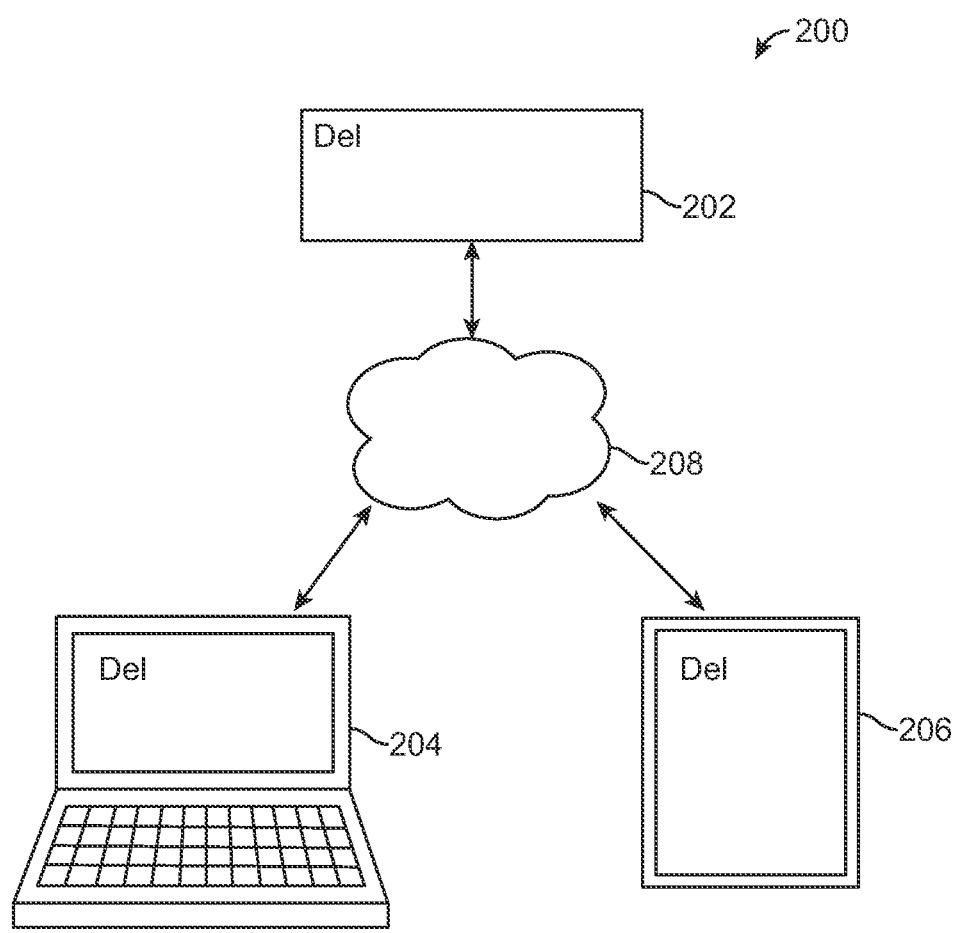
FIG. 2B shows the synced online content management system from FIG. 2A in which the system has prioritized the first structural operation over the competing structural operation and distributed the first structural operation.

FIG. 2B shows the synced online content management system of FIG. 2A in which the system prioritizes the first structural operation over the competing structural operation and distributes the first structural operation to all synced devices. More specifically, content management server 202 detects that the first structural operation is from a laptop device type and that the competing structural operation is from a mobile device type and thus prioritizes the first structural operation from laptop 204 to delete image 210 over the competing structural operation from mobile device 206 to rename image 210 from "DSC001.jpg" to "face.jpg". Content management server 202 then sends this prioritized structural operation to mobile device 206. The end result, as shown in FIG. 2B, is that all synced devices, including content management server 202, laptop 204, and mobile device 206 have deleted image 210.

Figure 3A:
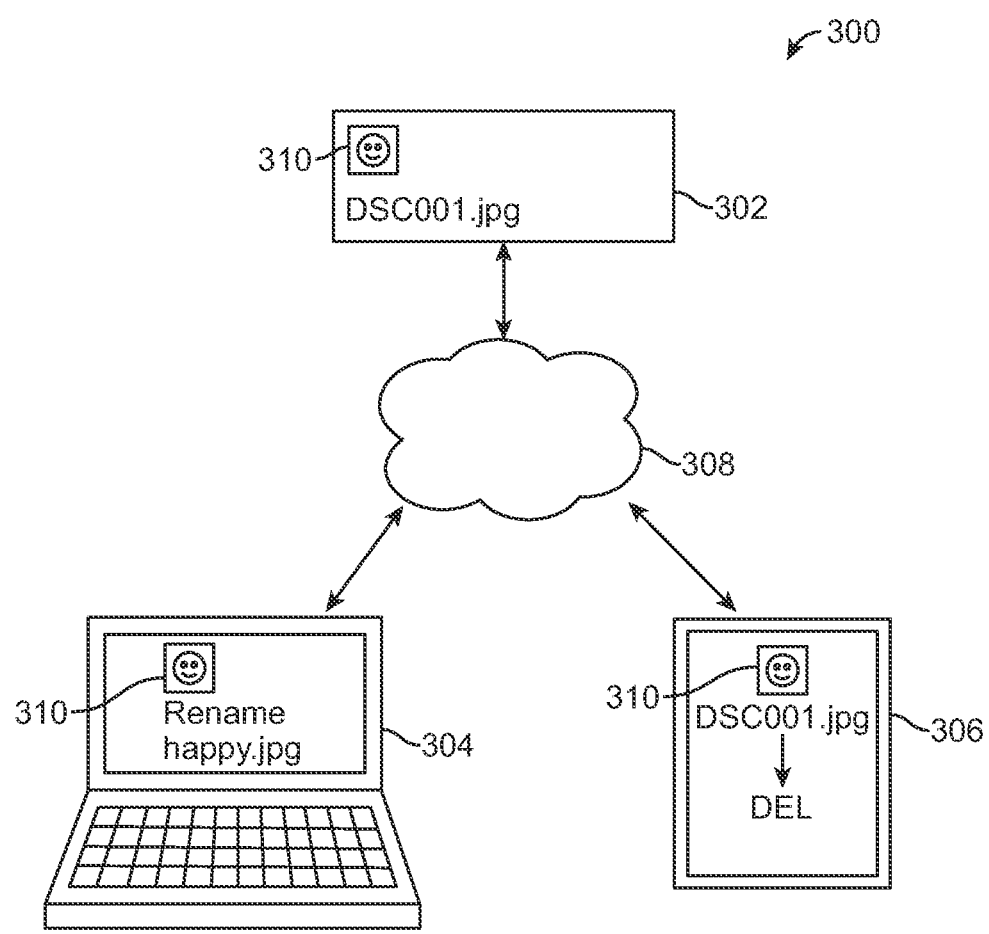
FIG. 3A shows a synced online content management system in which a first structural operation is sent from a first client device and a competing structural operation is sent from a second client device.

FIG. 3A shows a synced online content management system in which a first structural operation is sent from a first client device and a competing structural operation is sent from a second client device. Example sync environment 300 includes content management server 302 that communicates with synced devices laptop 304 and mobile device 306 over network 308. As shown in FIG. 3A, image 310 is synced between content management server 302, laptop 304, and mobile device 306. Content management server 302 receives a first structural operation or command from mobile device 306 to delete image 310. Content management server 302 receives a competing structural operation or command from laptop 304 to rename image 310 from "DSC001.jpg" to "happy.jpg". The first structural operation and competing structural operation shown in FIG. 3A are illustrative only and any structural operations capable of being sent by synced devices in a synced online content management system can utilize the disclosed technology.

Figure 3B:
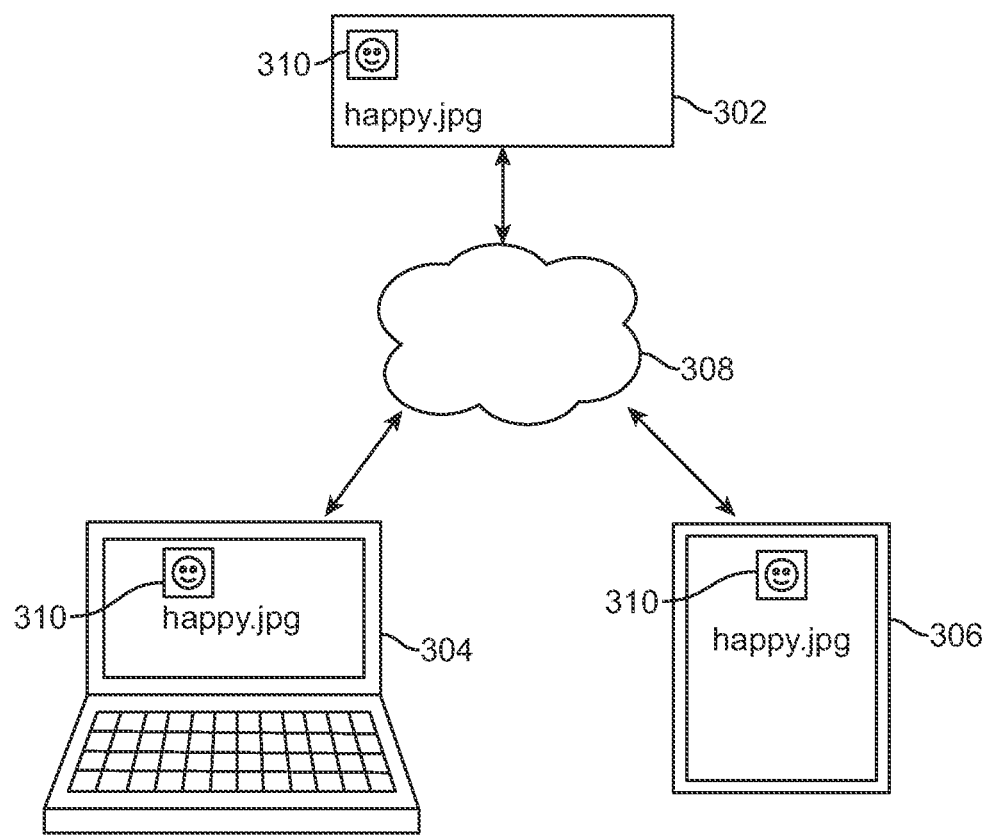
FIG. 3B shows the synced online content management system from FIG. 3A in which the system has prioritized the first structural operation over the competing structural operation and distributed the first structural operation.

FIG. 3B shows the synced online content management system from FIG. 3A in which the system prioritizes the competing structural operation over the first structural operation and distributes the competing structural operation to all synced devices. More specifically, content management server 302 detects that the competing structural operation is from a laptop device type and that the first structural operation is from a mobile device type and thus prioritizes the competing structural operation from laptop 304 to rename image 310 from "DSC001.jpg" to "happy.jpg" over the first structural operation from mobile device 306 to delete image 310. Content management server 302 then sends this prioritized structural operation to mobile device 306. The end result, as shown in FIG. 3B, is that all synced devices, including content management server 302, laptop 304, and mobile device 306 have renamed image 310 from "DSC001.jpg" to "happy.jpg".

Figure 4A:
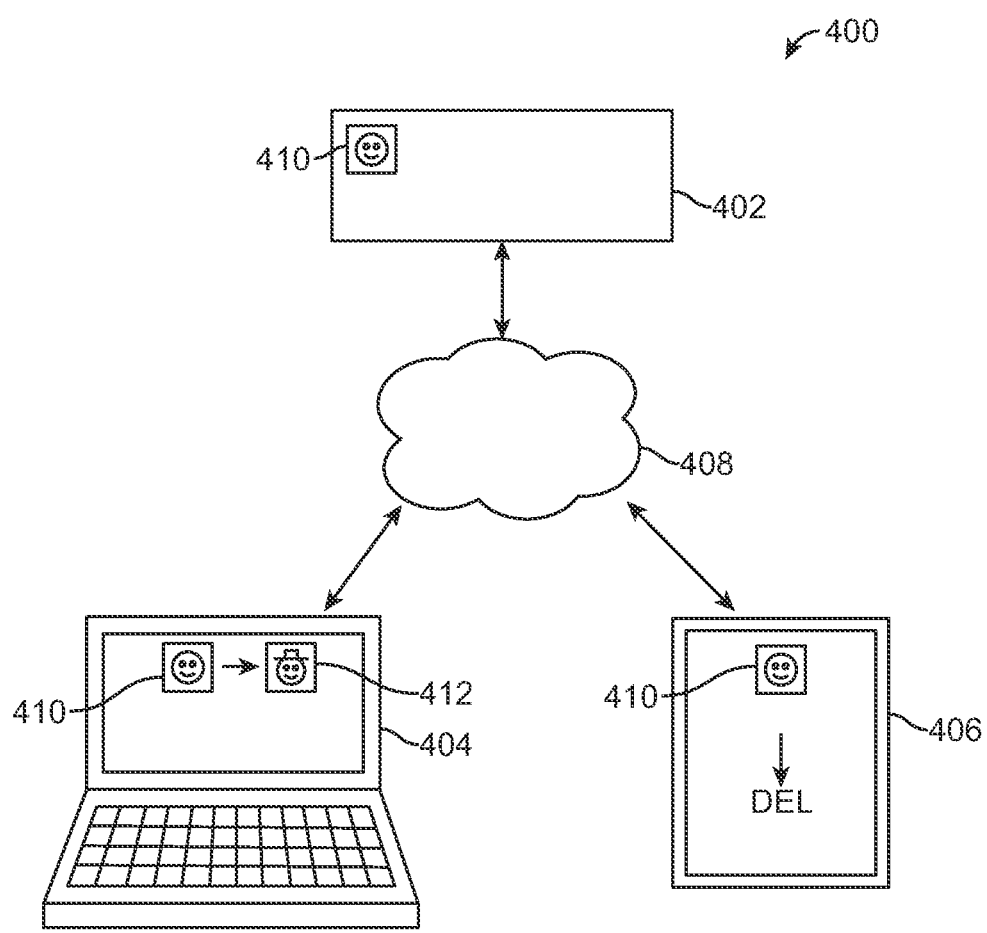
FIG. 4A shows a synced online content management system in which a first structural operation is sent from a first client device and a competing structural operation is sent from a second client device.

FIG. 4A shows a synced online content management system in which a first structural operation is sent from a first client device and a competing structural operation is sent from a second client device. Example sync environment 400 includes content management server 402 that communicates with synced devices laptop 404 and mobile device 406 over network 408. As shown in FIG. 4A, image 410 is synced between content management server 402, laptop 404, and mobile device 406. Content management server 402 receives a first structural operation or command from laptop 404 to replace image 410 with edited image 412. Content management server 402 receives a competing structural operation or command from mobile device 406 to delete image 410. The first structural operation and competing structural operation shown in FIG. 4A are illustrative only and any structural operations capable of being sent by synced devices in a synced online content management system can utilize the disclosed technology.

Figure 4B:
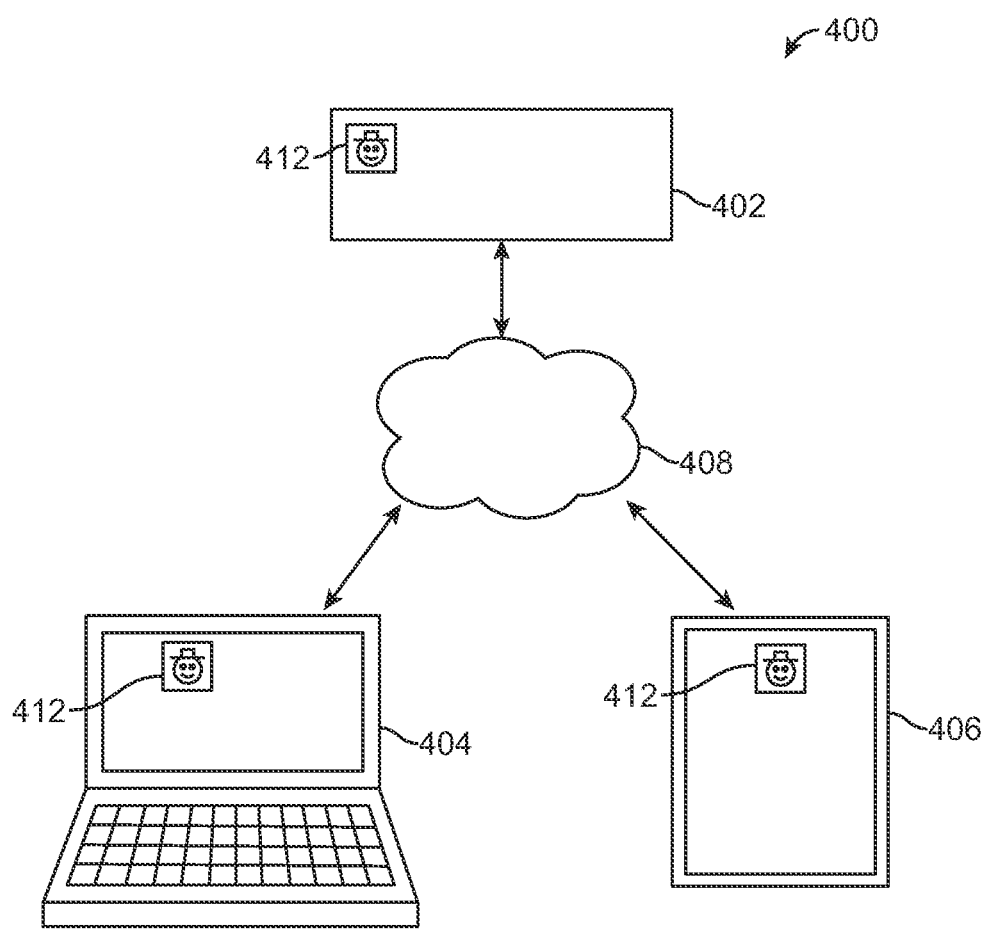
FIG. 4B shows the synced online content management system from FIG. 4A in which the system has prioritized the first structural operation over the competing structural operation and distributed the first structural operation.

FIG. 4B shows the synced online content management system from FIG. 4A in which the system prioritizes the first structural operation over the competing structural operation and distributes the first structural operation to all synced devices. More specifically, content management server 402 detects that the first structural operation is from a laptop device type and that the competing structural operation is from a mobile device type and thus prioritizes the first structural operation from laptop 404 to replace image 410 with edited image 412 over the competing structural operation from mobile device 406 to delete image 410. Content management server 402 then distributes this prioritized structural operation to mobile device 406. The end result, as shown in FIG. 4B, is that all synced devices, including content management server 402, laptop 404, and mobile device 406 have replaced image 410 with edited image 412.

FIG. 5 shows an entry table corresponding to the executed first structural operation from FIG. 2B. More specifically, entry table 500 shows a single entry for image 210 from FIG. 2A and FIG. 2B including content item hash value 502, content item ID 504, and deletion indicator 506. Content item hash value 502 can be any hash taken from a content item represented in entry table 500, such as image 210 from FIG. 2A and FIG. 2B. Content item ID 504 can be any metadata associated with a content item, such as image 210. As shown, content item ID 504 is "DSC001.jpg". In response to content management server 202 prioritizing the first structural operation from laptop 204 to delete image 210, deletion indicator 506 is changed to a "yes" status. This status is then sent to all synced devices to delete image 210.

FIG. 6 shows an entry table corresponding to the executed first structural operation from FIG. 3B. More specifically, entry table 600 shows a first entry for image 310 and second entry for renamed image 312 from FIG. 3A and FIG. 3B. The first entry includes content item hash value 602, content item ID 604, and deletion indicator 606. The second entry includes content item hash value 608, content item ID 610, and deletion indicator 612. As shown, content item ID 604 is "DSC001.jpg". In response to content management server 302 prioritizing the first structural operation from laptop 304 to replace image 310 with renamed image 312, deletion indicator 606 is a "yes" status. The second entry includes content item hash value 608, content item ID 610, and deletion indicator 612 corresponding to the renamed image 312 from FIG. 3B, which includes content item ID 610 as "happy.jpg".

FIG. 7 shows an entry table corresponding to the executed first structural operation from FIG. 4B. More specifically, entry table 700 shows a first entry for image 410 and second entry for edited image 412 from FIG. 4A and FIG. 4B. The first entry includes content item hash value 702, content item ID 704, and deletion indicator 706. The second entry includes content item hash value 708, content item ID 710, and deletion indicator 712. As shown, content item ID 704 is "DSC001.jpg". In response to content management server 402 prioritizing the first structural operation from laptop 404 to replace image 410 with edited image 412, deletion indicator 706 is a "yes" status. The second entry includes content item hash value 708, content item ID 710, and deletion indicator 712 corresponding to edited image 412 from FIG. 4B, which includes content item hash value 408 as C. Content item hash value 702 can differ from content item hash value 708, because image 410 contains different data than edited image 412.

Figure 8:
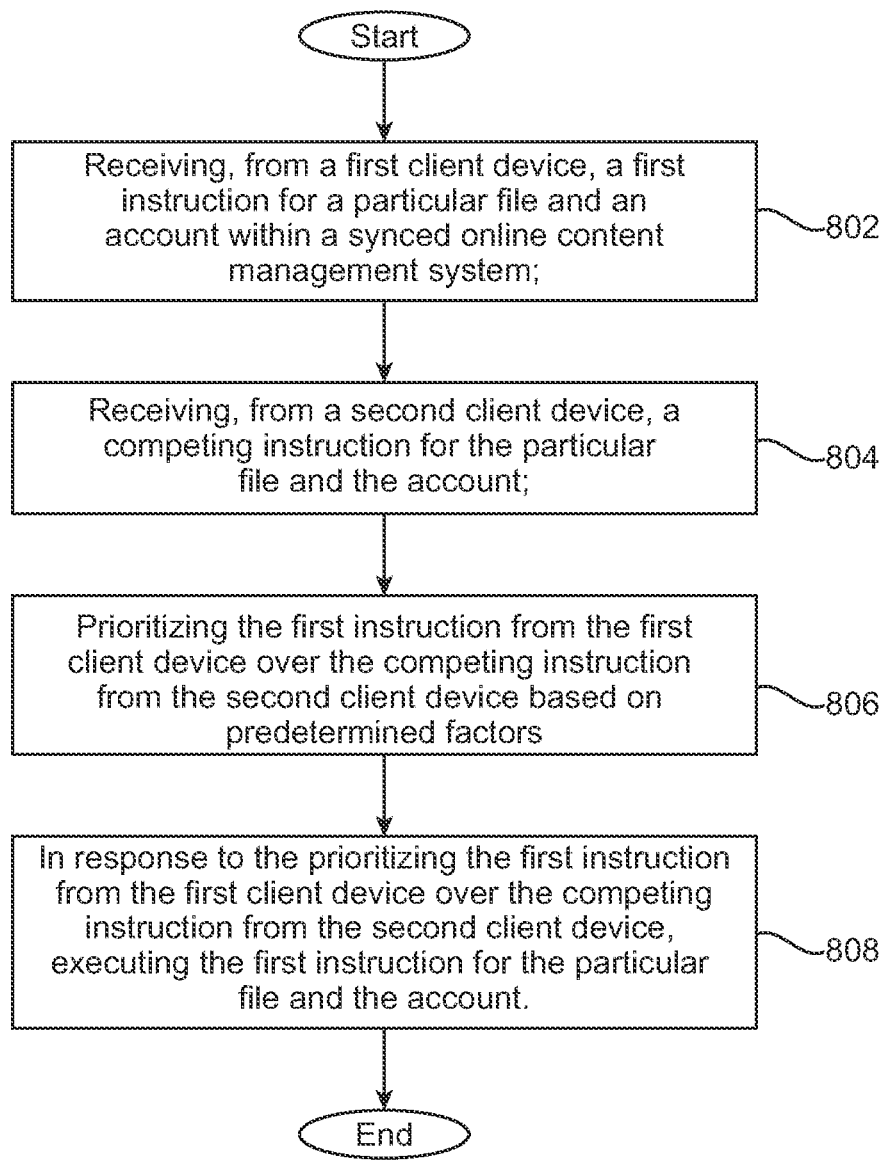
FIG. 8 shows an example method for a synced online content management system to prioritize structural operations received from multiple client devices.

FIG. 8 shows an example method for a synced online content management system to prioritize structural operations received from multiple client devices. At step 802, the method includes receiving, from a first client device a first structural operation for a particular content item and account within a synced online content management system. At step 804, the method includes receiving, from a second client device a competing structural operation for the particular content item and the account. At step 806, the method includes prioritizing the first structural operation from the first client device over the competing structural operation from the second client device based on predetermined factors, such as a detected device type of the first client device and a detected device type of the second client device. Other predetermined factors can include detected higher level of authority for the first client device and a lower level of authority for the second client device, or detected master access to the account for the first client and shared access to the account for the second client device.

At step 808, in response to the prioritizing the first structural operation from the first client device over the competing structural operation from the second client device, the method includes executing the first structural operation for the particular content item and the account.

In one example, the first structural operation includes deleting the particular content item from the account and the competing structural operation includes adding the particular content item to the account. In a second example, the first structural operation includes deleting the particular content item and the competing structural operation includes adding a renamed copy of the particular content item to the account. In a third example, the first structural operation includes deleting the particular content item and the competing structural operation includes adding an edited version of the particular tile to the account. These examples of structural operations or commands capable of being sent by a synced device to a server are merely illustrative. One of ordinary skill in the art will recognize that any communication capable of being sent from a device to a server can utilized the disclosed technology.

The example method can further include distributing the prioritized structural operation to all synced devices by sending a command to the devices to delete a local copy of the particular content item. The example method can also include, after executing the first structural operation, denying a request (including future requests) from any client device to add the particular content item to the account.

Figure 9:
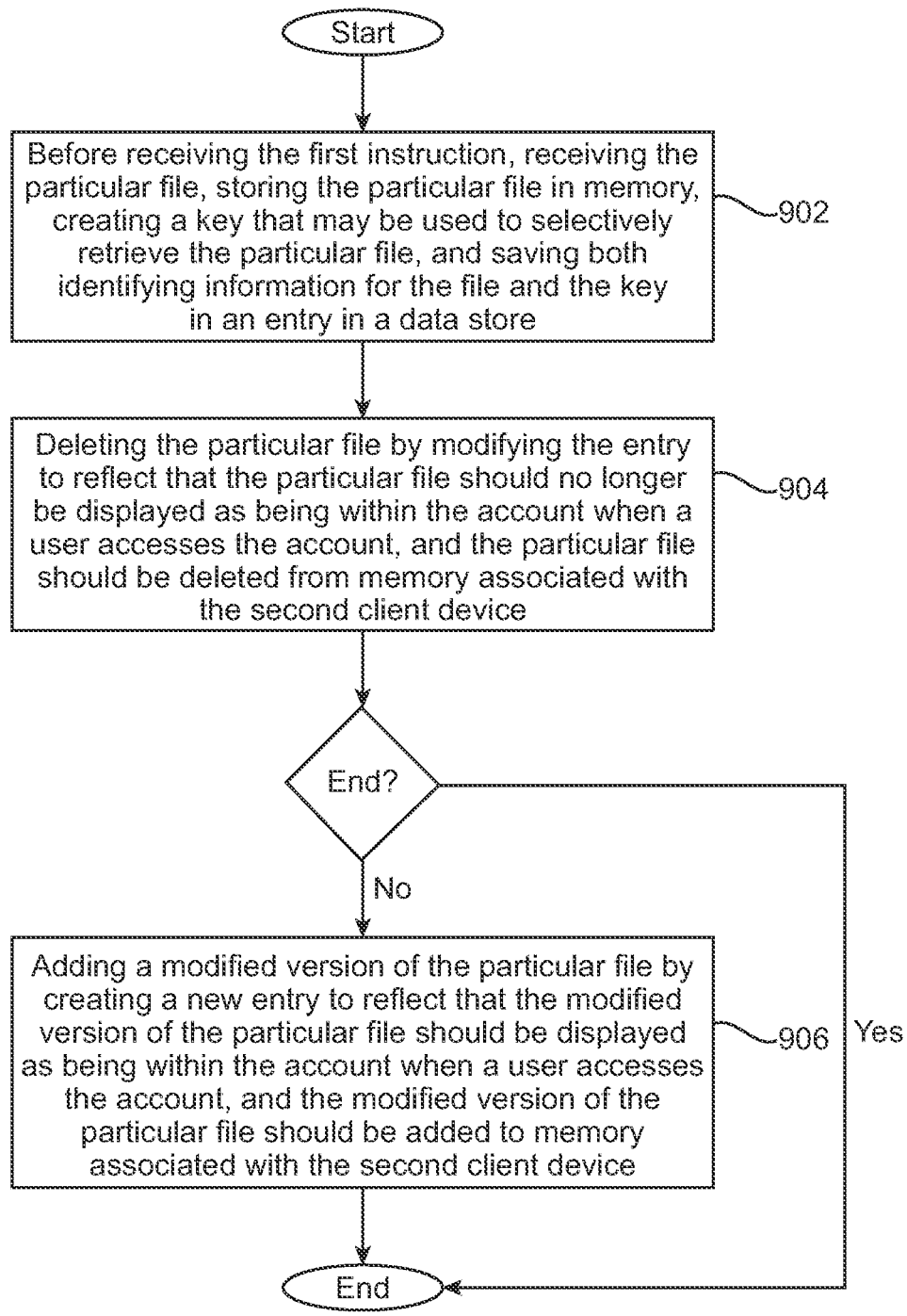
FIG. 9 shows an example method for a synced online content management system to execute a delete or edit command.

FIG. 9 shows an example method for a synced online content management system to execute a delete or edit command. The example method begins at step 902 and includes receiving a particular content item, storing the particular content item in memory, creating a key that may be used to selectively retrieve the particular content item, and saving both identifying information for the content item and the key in an entry in a data store. The key can be a hash value calculated from the particular content item that is used to retrieve the content item from storage. The key can be used to retrieve the content item from a storage system. The method then proceeds to step 904 and includes deleting the particular content item by modifying the entry to reflect that the particular content item should no longer be displayed as being within the account when a client application accesses the account, and that the particular content item should be deleted from memory associated with the second client device. If the prioritized structural operation is deleting a particular content item from an account, the method is completed. If the prioritized structural operation is adding an edited version of the particular content item from the account the example method proceeds to step 906 and includes adding a modified version of the particular content item by creating a new entry to reflect that the modified version of the particular content item should be displayed as being within the account when a client application accesses the account and that the modified version of the particular content item should be added to memory associated with the second client device.

FIG. 10A, and FIG. 10B illustrate exemplary possible system embodiments. The more appropriate embodiment will be apparent to those of ordinary skill in the art when practicing the disclosed technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software structural operations are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the disclosed technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable structural operations that are stored or otherwise available from computer readable media. Such structural operations can comprise, for example, structural operations and data which cause or otherwise configure a general purpose computer, special purpose computer, or special purpose processing device to perform a certain function or group of functions. Portions of computer resources used can be accessible over a network. The computer executable structural operations may be, for example, binaries, intermediate format structural operations such as assembly language, firmware, or source code. Examples of computer-readable media that may be used to store structural operations, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The structural operations, media for conveying such structural operations, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving at a synced online content management system, from a first client application associated with the synced online content management system on a first client device, a first structural operation for a particular content item associated with a first account within the synced online content management system, wherein the first client device created the particular content item and has a master access permission to the particular content item, and the first account shared the particular content item with a second account on a second client device using the first account granting the second account shared access permission;
receiving at the synced online content management system, from a second client application associated with the synced online content management system on the second client device, a competing structural operation for the particular content item associated with the second account;

prioritizing, by a processor of the synced online content management system, the first structural operation from the first client application over the competing structural operation from the second client application based on the master access permission of the first account, that the first account shared the particular content item, and on at least one predetermined factor that includes a detected device type of the first client device and a device type of the second client device or a detected higher level of authority for the first client device and a lower level of authority for the second client device; and executing at the synced online content management system the prioritized structural operation for the particular content item.

2. The computer-implemented method of claim 1, wherein the first client device type is a desktop computer and the second client device type is a mobile device.

3. The computer-implemented method of claim 1, wherein the first structural operation includes deleting the particular content item from the first account and the competing structural operation includes adding the particular content item to the second account.

4. The computer-implemented method of claim 1, wherein the first structural operation includes deleting the particular content item and adding a renamed copy of the particular content item to the first account.

5. The computer-implemented method of claim 1, wherein the first structural operation includes deleting the particular content item and adding an edited version of the particular content item to the first account.

6. The computer-implemented method of claim 3, further comprising sending a command to the second client application to delete a local copy of the particular content item.

7. The computer-implemented method of claim 3, further comprising, after executing the first structural operation, denying a request from a client device to add the particular content item to the second account.

8. The computer-implemented method of claim 1 further comprising:
the particular content item is stored in memory together with an entry including identifying information and a key used to retrieve the particular content item from the memory; and
the first structural operation is a structural operation to delete the particular content item from the first account, deleting the particular content item by modifying the entry to reflect that the particular content item is no longer displayed as being within the first account when the first client application requests access to the particular content item, and the particular content item is deleted from memory associated with the second account.

9. The computer-implemented method of claim 8, wherein the method further comprises:
adding a modified version of the particular content item by creating a new entry to reflect that the modified version of the particular content item is displayed as being within the first account when the first client application accesses the account, and that the modified version of the particular content item is added to memory associated with the second account.

10. The computer-implemented method of claim 8 further comprising:

creating the key, wherein creating the key includes determining a hash value for the content item and using the determined hash value as the key.

11. A non-transitory computer-readable medium storing computer-executable instructions for causing a computer to:
receive at a synced online content management system, from a first client application associated with the synced online content management system on a first client device, a first structural operation for a particular content item and a first account within the synced online content management system, wherein the first client device created the particular content item and has a master access permission to the particular content item, and the first account shared the particular content item with a second user account on a second client device using the first account granting the second account shared access permission;

receive at the synced online content management system, from a second client application associated with the synced online content management system on the second client device, a competing structural operation for the particular content item associated with the second account;

prioritize the first structural operation from the first client application over the competing structural operation from the second client application based on the master access permission of the first account, that the first account shared the particular content item, and on at least one predetermined factor that includes a detected device type of the first client device and a device type of the second client device or a detected higher level of authority for the first client device and a lower level of authority for the second client device; and execute at the synced online content management system the prioritized structural operation for the particular content item and the account.

12. The non-transitory computer-readable medium of claim 11, wherein the first client device type is a desktop computer and the second client device type is a mobile device.

13. The non-transitory computer-readable medium of claim 11, wherein the first structural operation includes deleting the particular content item from the first account and the competing structural operation includes adding the particular content item to the second account.

14. The non-transitory computer-readable medium of claim 11, wherein the first structural operation includes deleting the particular content item and adding a renamed copy of the particular content item to the first account.

15. A system comprising:
a processor; and
memory containing processor-executable structural operations that, when executed, cause the processor to:
receive at a synced online content management system, from a first client application associated with the synced online content management system on a first client device, a first structural operation for a particular content item and first account within the synced online content management system, wherein the first client device created the particular content item and has a master access permission to the particular content item, and the first account shared the particular content item with a second user account on a second client device using the first account granting the second account shared access permission;
receive at the synced online content management system, from a second client application associated with the synced online content management system on the second client device, a competing structural operation for the particular content item associated with the second account;

prioritize, by a processor at the synced online content management system, the first structural operation from the first client application over the competing structural operation from the second client application based on the master access permission of the first account, that the first account shared the particular content item, and on at least one predetermined factor, that includes a detected device type of the first client device and a device type of the second client device or a detected higher level of authority for the first client device; and execute at the synced online content management system the prioritized structural operation for the particular content item and the account.

16. The system of claim 15, wherein the first client device type is a desktop computer and the second client device type is a mobile device.

17. The system of claim 15, wherein the first structural operation includes deleting the particular content item from the first account and the competing structural operation includes adding the particular content item to the second account.

18. The system of claim 15, wherein the first structural operation includes deleting the particular content item and adding a renamed copy of the particular content item to the first account.

19. The system of claim 15, wherein the first structural operation includes deleting the particular content item and adding an edited version of the particular file to the first account.

20. The system of claim 19, further comprising sending a command to the second client application to delete a local copy of the particular content item.

21. The system of claim 19, further comprising, after executing the first structural operation, denying a request from the first client application to add the particular content item to the first account.

* * * * *